United States Patent Office 2,772,296
Patented Nov. 27, 1956

2,772,296

PROCESS FOR PREPARING EPOXY ESTERS

Albert C. Mueller, Berkeley, Calif., assignor to Shell Development Company, New York, N. Y., a corporation of Delaware No Drawing. Application November 23, 1953,
Serial No. 393,933

10 Claims. (Cl. 260—348)

This invention relates to a new process for preparing epoxy esters, and more particularly, to a novel method for preparing esters of epoxy-substituted alcohols and organic carboxylic acids.

Specifically, the invention provides a new and highly efficient process for preparing esters of alcohols having an epoxy group, i. e., a

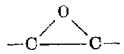

group, attached to the carbon atom bearing the —OH group, such as, for example, 2,3-epoxypropanol (glycidol), and organic carboxylic acids, which comprises heating the desired carboxylic acid with at least twice the chemical equivalent amount of an epoxy-halo-substituted compound having the halogen atom attached to a carbon atom adjacent to the epoxy group, such as epichlorohydrin, in the presence of a minor amount of a member of the group consisting of tertiary amines and quaternary salts, and then recovering the desired epoxy ester from the reaction mixture, preferably by distillation.

Epoxy esters, such as, for example, glycidyl methacrylate, are becoming increasingly important in industry as stabilizers, plasticizers and as monomers for use in preparing resinous products. Because of the presence of the highly reactive epoxy group, these esters are more difficult to prepare and isolate than the simple unsubstituted esters, and considerable work has been done in trying to find a satisfactory method for preparing these esters. The preparation methods suggested have been satisfactory for use in preparing the esters on a laboratory scale, but they have all possessed certain defects which render them undesirable for use for large scale production of the esters. It has been suggested, for example, that the esters be prepared by reacting a sodium salt of the desired acid with a halo-substituted epoxy compound, such as epichlorohydrin. This method is undesirable for large scale use because it employs the alkali salts which are sometimes difficult to obtain, and because the process is slow and laborious and sometimes requires the use of very high reaction temperatures. It has also been proposed to prepare the esters by reacting an epoxy-substituted alcohol, such as glycidol, with the acid chloride. This method is unsuited for large scale operations, as many of the epoxy alcohols, such as glycidol, are difficult to prepare, the reaction must be conducted under anhydrous conditions, and some means must be employed to remove the formed hydrogen halide so that it will not undergo further reaction with the desired esters.

It is an object of the invention, therefore, to provide a new method for preparing epoxy esters. It is a further object to provide a new and improved method for preparing esters of epoxy-substituted alcohols and organic carboxylic acids. It is a further object to provide a method for preparing epoxy esters which utilizes inexpensive reactants and convenient reaction conditions. It is a further object to provide a method for preparing epoxy esters that is easily operated and gives high yield of product. It is a further object to provide a method for preparing epoxy esters which is suitable for use for large scale operations. It is a further object to provide a new and highly efficient method for preparing glycidyl esters of organic monocarboxylic acids. Other objects and advantages of the invention will be apparent from the following detailed description thereof.

It has now been discovered that these and other objects may be accomplished by the process of the invention which comprises heating the desired carboxylic acid with at least twice the chemical equivalent amount of an epoxy-halo-substituted compound having the halogen atom attached to a carbon atom adjacent to the epoxy group, such as epichlorohydrin, in the presence of a minor amount of a member of the group consisting of tertiary amines and quaternary salts, such as, for example, a tetraalkylammonium chloride, and then recovering the desired epoxy ester from the reaction mixture, preferably by distillation. It has been found that by the use of this new method involving the direct reaction of the acid with a critical excess of the halo-epoxy-substituted compound in the presence of the special catalysts, one is able to obtain the desired epoxy esters in unexpectedly high yields and with a minimum of operational time and procedure. The process is particularly adapted for large scale use in that it employs the acid as such rather than in the form of the more expensive acid chlorides or acid salts, is substantially free of polymerization of the reactants or products and thereby offers no danger of clogging of the equipment, and can be conducted under anhydrous or hydrous conditions. Further advantage is found in the fact that there is no need for removing any hydrogen halide or salt and the desired esters may, in most instances, be removed in relatively pure form by simple distillation procedure. In the preparation of the glycidyl esters of the monocarboxylic acids, for example, one need merely distill the mixture to recover the excess epichlorohydrin, the glycerol dichlorohydrin and the higher boiling epoxy ester.

The acids used in the process of the invention may be any organic carboxylic acid. The acids may be aliphatic, cycloaliphatic, aromatic or heterocyclic and may be saturated or unsaturated. The acids may also be substituted with non-interfering substituents, such as alkoxy radicals, ester radicals, and the like. Examples of these acids include, among others, butyric acid, propionic acid, valeric acid, caproic acid, caprylic acid, palmitic acid, stearic acid, oleic acid, ethacrylic acid, crotonic acid, sorbic acid, linoleic acid, cinnamic acid, phenylacetic acid, methylbenzoic acid, tert-butylbenzoic acid, 1-naphthoic acid, rosin acid, phthalic acid, isophthalic acid, terephthalic acid, adipic acid, succinic acid, pelargonic acid, lauric acid, hendecanoic acid, cyclohexanecarboxylic acid, 3-methylcyclohexanecarboxylic acid, and methoxycyclohexanecarboxylic acid.

Preferred acids to be used in the process are the aliphatic, cycloaliphatic and aromatic dicarboxylic acids and monocarboxylic acids containing no more than 20 carbon atoms, such as, for example, acrylic acid, methacrylic acid, benzoic acid, methoxybenzoic acid, tert-butylbenzoic acid, toluic acid, phthalic acid, isophthalic acid, adipic acid, succinic acid, methoxysuccinic acid, crotonic acid, sorbic acid, phenylacetic acid, pelargonic acid, lauric acid and stearic acid.

Particularly preferred acids, especially because of the ease of preparation and recovery of the resulting esters, are the monocarboxylic acids, and particularly the aliphatic, cycloaliphatic and aromatic monocarboxylic acids containing no more than 18 carbon atoms. Of special consideration are the alkanoic, alkenoic and aryl, alkaryl and arylalkyl monocarboxylic acids containing up to 14 carbon atoms. "Alkaryl" as used herein refers to an alkyl substituted aryl radical, and "arylalkyl" refers to an aryl substituted alkyl radical.

The epoxy-halo-substituted compounds used in the process are those having a 1,2-epoxy group, i. e., a

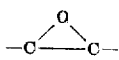

group, which is joined directly to an aliphatic carbon atom bearing a halogen atom. These compounds may be substituted with aliphatic, aromatic cycloaliphatic or heterocyclic radicals which may be further substituted with non-interfering substituents, such as ester groups, ether radicals and the like. Examples of the epoxy-halo-substituted compounds include, among others, epichlorohydrin, epibromohydrin, epifluorohydrin, 1-chloro-2,3-epoxybutane, 1-chloro-2,3-epoxyhexane, 1-chloro-2,3-epoxy-4-phenyloctane, 1-chloro-2,3-epoxy-4,5-diethyldodecane, 3-chloro-4,5-epoxyoctane, 4-chloro-5,6-epoxydodecane, 1-chloro-2,3-epoxycyclohexane, 1-chloro-2,3,5,6-diepoxydecane, 1-bromo-2,3-epoxyhexane, 1-bromo-2,3-epoxy-5-phenyldodecane and 1-bromo-2,3-epoxy-4-cyclohexyloctane.

Preferred epoxy-halo-substituted compounds to be used are those of the general formula

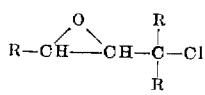

wherein R is hydrogen or a hydrocarbon radical, and preferably an aliphatic hydrocarbon radical containing from 1 to 10 carbon atoms, such as epichlorohydrin, 1-chloro-2,3-epoxyhexane, 1-chloro-2,3-epoxy-4-butyloctane, 1-chloro-2,3-epoxyheptane, 3-chloro-4,5-epoxydodecane, 3-chloro-4,5-epoxynonane and 1-chloro-2,3-epoxy-4-cyclohexyloctane.

Of special interest, particularly because of the efficiency with which the process may be carried out, are the epoxy alkyl halides, and particularly the 1-chloro-2,3-epoxyalkanes, such as epichlorohydrin.

The quaternary salts that may be used as catalysts for the reaction are preferably those of the formula

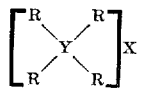

wherein Y is nitrogen, phosphorus or arsenic, X is an ion of an inorganic acid, and R is a hydrocarbon radical, such as an alkyl, cycloalkyl, aryl, alkaryl arylalkyl, and the like, radicals. Examples of these salts include, among others, benzyltrimethylammonium chloride, phenyltributylammonium chloride, cyclohexyltributylammonium sulfate, benzyltrimethylammonium sulfate, benzyltrimethylphosphonium chloride, phenyltrioctylammonium sulfate, phenyltriethylarsonium chloride, tetramethylammonium chloride, tetrabutylammonium sulfate, tetraoctylammonium nitrate, diphenyldimethylammonium borate, diphenyldioctyl ammonium chloride, benzyltrimethylammonium borate, diphenyldimethylphosphonium chloride, dicyclohexyldiethylarsonium chloride, benzyltrinonylammonium chloride and benzyltridodecylammonium sulfate.

Particularly preferred quaternary salts to be used in the process are those of the formula

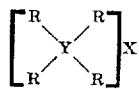

wherein Y is nitrogen, R is an alkyl, aryl or arylalkyl radical, preferably containing no more than 12 carbon atoms, and X is a chlorine or bromine, such as benzyltrimethylammonium chloride, benzyltrimethylammonium bromide, cyclohexyltrimethylammonium bromide, phenyltrioctylammonium chloride, tetrabutylammonium chloride and tetraoctylammonium chloride.

The tertiary amines that may be used as catalysts are those mono- or polyamines having an open chain or cyclic structure which have all of the amine hydrogen replaced by suitable substituents, such as hydrocarbon radicals, and preferably aliphatic, cycloaliphatic, or aromatic radicals. Examples of these amines include, among others, triethylamine, tributylamine, dimethyl benzylamine, triphenylamine, tricyclohexylamine, pyridine, quinoline, and the like.

Preferred amines are the trialkyl, tricycloalkyl and triaryl amines, such as triethylamines, triphenylamine, tri-(2,3-dimethylcyclohexyl)amine, and the like. Weak tertiary amines, e. g., amines that in aqueous solution gives a pH less than 10, are particularly preferred.

In the operation of the process, it is essential that the carboxylic acid be combined with at least twice the chemical equivalent amount of the epoxy-halo-substituted compound, and more preferably with at least four times the chemical equivalent amount of the epoxy-halo-substituted compound. As used herein and in the appended claims, the expression "chemical equivalent amount" as used in relation to the carboxylic acid and epoxy-halo-substituted compound refers to the amount needed to furnish one carboxyl group for every epoxy group. Preferably the carboxylic acid is reacted with from four to twelve times the chemical equivalent amount of the epoxy-halo-substituted compound, and, in the case of the epoxy-halo-substituted compounds, such as epichlorohydrin, the acid and epoxy-halo-substituted compounds are reacted in preferred chemical equivalent ratios of 1:4 to 1:8.

The amount of the tertiary amine or quaternary salt to be used in the process may vary over a considerable range. Generally, the amine or salt will be employed in amounts varying from about 0.01% to 5% by weight of the acid reactant. Preferred amounts vary from about .01% to 3% by weight of the acid.

Diluents and solvents may be employed as desired or needed to effect the desired solution or dilution. Suitable components of this type include, among others, inert liquid hydrocarbons, such as benzene, toluene and cyclohexane, and various other compounds, such as dioxane, acetone, methyl ethyl ketone, tert-butylalcohol, and the like.

In case the acid or epoxy compound contains unsaturated linkages susceptible to polymerization, it is preferred to add a polymerization inhibitor to the reaction mixture. Suitable inhibitors may be exemplified by sulfur, copper salts, tannic acid, phenyl-alpha-naphthylamine, and the like. These components are preferably employed in amounts varying from about .1% to 5% by weight of the unsaturated reactant. The inhibitors may subsequently be removed by any suitable means, such as washing, extraction, distillation, filtration, and the like.

The temperature employed in the process may vary over a considerable range. The temperature should be at least sufficiently high to effect the reaction, but should not be above the decomposition temperature of the reactants. As a general proposition, temperatures ranging from about 50° C. to 150° C. are suitable, with temperatures ranging from about 60° C. to 125° C. being more preferred. For the preparation of the esters using epichlorohydrin or epibromohydrin, it is generally preferred to maintain the mixture at the boiling temperature, which, in most cases, ranges from about 100° C. to about 140° C. Atmospheric, superatmospheric or subatmospheric pressures may be used as desired.

The esters formed in the reaction mixture may be recovered by any suitable method, such as distillation, extraction, crystallization, filtration, and the like. In the case of the distillable esters, such as the glycidyl esters of the monocarboxylic acids, they are preferably recovered by distillation under reduced pressure. In this case, it is the usual procedure to first remove the lower boiling components, such as the excess epichlorohydrin or epibromohydrin and the glycerol dichloro- or dibromohydrins, and then recover the higher boiling ester.

The process may be conducted batch-wise or in a semicontinuous or continuous manner as desired. The process is particularly adapted for use in a continuous manner and that is the preferred way of conducting the process. When the process is used to prepare the glycidyl esters of the monocarboxylic acids, the process is preferably conducted by passing a mixture of the acid and epoxy-halo-substituted compound through a reaction zone maintained at about 50° C. to 80° C., then injecting the amine or quaternary salt, conducting the mixture to a reaction kettle where the mixture is maintained at reflux. The excess epichlorhydrin or epibromohydrin and glycerol dichlorohydrin are taken overhead and the ester is taken off under reduced pressure.

The apparatus used for the process may be constructed in any suitable manner as long as it provides necessary means for introduction of the reactants, application of heat and the separation of the products. Apparatus constructed of stainless steel are particularly suitable.

To illustrate the maner in which the invention may be carried out, the following examples are given. It is to be understood, however, that the examples are for the purpose of illustration and the invention is not to be regarded as limited to any of the specific materials or conditions recited therein.

*Example I*

122 parts of benzoic acid was added to 700 parts of epichlorohydrin and the mixture heated to 70° C. .5 part of benzyltrimethylammonium chloride was added and the mixture refluxed at 115° C. to 118° C. for a few hours. The mixture was then distilled under 1.0 mm. pressure to remove the excess epichlorohydrin, glycerol dichlorohydrin and glycidyl benzoate. The glycidyl benzoate, which was a colorless fluid liquid (B. P. 103° C./1 mm.) was obtained in 80% yield based on the epichlorohydrin.

*Example II*

About 86 parts of crotonic acid was added to 700 parts of epichlorohydrin and the mixture heated to 70° C. 1 part of benzyltrimethylammonium chloride was added and the mixture heated for a few hours at 125° C. The mixture was then distilled under reduced pressure to remove the excess epichlorohydrin, glycerol dichlorohydrin and the glycidyl crotonate. The glycidyl crotonate was recovered in high yield as a fluid liquid having a boiling point of 63° C. at 1 mm. pressure.

*Example III*

About 73 parts of adipic acid was added to 400 parts of epichlorohydrin and the mixture held at 70° C. for about 1 hour. 1 part of benzyltrimethylammonium chloride was added and the mixture refluxed. The mixture was then distilled under reduced pressure to remove the excess epichlorohydrin and glycerol dichlorohydrin. The glycidyl adipate was recovered in high yield as a fluid liquid.

*Example IV*

About 86 parts of methacrylic acid is added to 700 parts of epichlorohydrin and 1 part of phenyl-alpha-naphthylamine and the mixture heated to 70° C. 1 part of benzyltrimethylammonium chloride is then added and the mixture refluxed for several hours at 125° C. The mixture is then distilled under reduced pressure to remove the excess epichlorohydrin and glycerol dichlorohydrin. The glycidyl methacrylate, a white liquid (B. P. 85° C. at 15 mm.) is recovered in high yield.

*Example V*

About 73 parts of succinic acid is added to 700 parts of epichlorohydrin and the mixture held at 70° C. for 1 hour. 1 part of benzyltrimethylammonium chloride is added and the mixture refluxed for 3 hours at 125° C. The mixture is then distilled under reduced pressure to remove the excess epichlorohydrin and glycerol dichlorohydrin. Glycidyl succinate, a viscous liquid, is then recovered in high yield as the desired product.

*Example VI*

About 70 parts of benzoic acid is added to 700 parts of epichlorohydrin and the mixture held at 70° C. .75 part of tetrabutylammonium chloride is then added and the mixture heated to 100° C. After several hours, the mixture is distilled to remove the excess epichlorohydrin, glycerol dichlorohydrin and the glycidyl benzoate.

*Example VII*

About 128 parts of cyclohexanecarboxylic acid is added to 700 parts of epichlorohydrin and the mixture heated to 80° C. 1 part of tetrabutylammonium chloride is then added and the mixture maintained at reflux. After several hours, the mixture is distilled to remove the excess epichlorohydrin, glycerol dichlorohydrin and the desired glycidyl cyclohexanecarboxylate.

*Example VIII*

About 122 parts of benzoic acid was added to 700 parts of epichlorohydrin and the mixture heated to 70° C. 1 part of tributylamine was added and the mixture refluxed for a few hours at 115° C. The mixture was then distilled under reduced pressure to remove the excess epichlorohydrin, glycerol dichlorohydrin and the glycidyl benzoate. The glycidyl benzoate, a fluid liquid having B. P. 103° C. at 1 mm. was recovered in high yield.

Similar results are obtained by replacing the triphenylamine in the above process with equivalent amounts of each of the following amines: triethylamine, tricyclohexyl amine and pyridine.

I claim as my invention:

1. A process for preparing an ester of an epoxy-substituted alcohol which comprises heating an unsubstituted hydrocarbon carboxylic acid of the class consisting of unsubstituted hydrocarbon monocarboxylic acids containing not more than 20 carbon atoms and unsubstituted hydrocarbon dicarboxylic acids containing not more than 20 carbon atoms with at least twice the chemical equivalent amount of a lower 1-chloro-2,3-epoxyalkane in the presence of a member of the group consisting of unsubstituted trialkylamines, unsubstituted tricycloalkylamines, unsubstituted triarylamines, pyridine, and quaternary ammonium salts wherein the substituents on the nitrogen are of the class consisting of lower alkyl groups and monocyclic aromatic hydrocarbon groups, and recovering 2,3-epoxyalkyl ester of said carboxylic acid from the reaction mixture.

2. A process as in claim 1 wherein the acid and the 1-chloro-2,3-epoxyalkane are combined in a chemical equivalent ratio of 1:2 to 1:10.

3. A process as in claim 1 wherein the quaternary ammonium salt is a benzyltrimethylammonium chloride.

4. A process as in claim 1 wherein the trialkylamine is tributylamine.

5. A process as in claim 1 wherein the acid is benzoic acid.

6. A process as in claim 1 wherein the acid is crotonic acid.

7. A process as in claim 1 wherein the acid is methacrylic acid.

8. A process as in claim 1 wherein the acid is crotonic acid.

9. A process as in claim 1 wherein the acid is cyclohexane-carboxylic acid.

10. A process as in claim 1 wherein the 1-chloro-2,3-epoxyalkane is epichlorohydrin.

References Cited in the file of this patent

UNITED STATES PATENTS

| | | |
|---|---|---|
| 2,457,300 | Boese | Dec. 28, 1948 |
| 2,537,981 | Edwards | Jan. 16, 1951 |

UNITED STATES PATENT OFFICE
Certificate

Patent No. 2,772,296                                          Patented November 27, 1956

Albert C. Mueller

Application having been made by Albert C. Mueller, the inventor named in the patent above identified, Shell Development Company, a corporation of Delaware, the assignee, and Edward C. Shokal, of Walnut Creek, California, for the issuance of a certificate under the provisions of Title 35, Section 256 of the United States Code, adding the name of said Edward C. Shokal to the patent as a joint inventor, and a showing and proof of facts satisfying the requirements of the said section having been submitted, it is this 12th day of May 1959, certified that the name of the said Edward C. Shokal is hereby added to the said patent as a joint inventor with the said inventor named in the patent.

[SEAL]

ARTHUR W. CROCKER,
*First Assistant Commissioner of Patents.*